United States Patent [19]

Emmett, Jr. et al.

[11] Patent Number: 5,057,284

[45] Date of Patent: Oct. 15, 1991

[54] BIOSLURRY REACTOR FOR TREATMENT OF SLURRIES CONTAINING MINERALS, SOILS AND SLUDGES

[75] Inventors: Robert C. Emmett, Jr., Salt Lake City; Lawrence T. O'Connor, Midvale; Gunter H. Brox, Salt Lake City, all of Utah

[73] Assignee: Envirotech, Menlo Park, Calif.

[21] Appl. No.: 322,666

[22] Filed: Mar. 13, 1989

Related U.S. Application Data

[63] Continuation-in-part of Ser. No. 248,620, Jan. 21, 1987, Pat. No. 4,968,008, which is a continuation-in-part of Ser. No. 5,670, Jan. 21, 1987, Pat. No. 4,974,816, which is a continuation-in-part of Ser. No. 827,324, Feb. 7, 1986, Pat. No. 4,728,082.

[51] Int. Cl.$^5$ ............................ B01F 7/16; B01F 7/18; B01F 7/20; C02F 11/02
[52] U.S. Cl. ............................ 422/225; 423/DIG. 17; 423/DIG. 20; 266/168
[58] Field of Search ............. 266/168, 101; 75/101 R, 75/743; 423/DIG. 17, DIG. 20; 422/225

[56] References Cited

U.S. PATENT DOCUMENTS

| | | | |
|---|---|---|---|
| 1,642,051 | 9/1927 | Wall | 261/122 |
| 2,718,275 | 9/1955 | Banks | 261/122 |
| 2,829,964 | 4/1958 | Zimmerley | 423/DIG. 17 |
| 3,336,016 | 8/1967 | Schreiber | 210/14 |
| 3,396,950 | 8/1968 | Wood | 261/122 |
| 3,433,629 | 3/1969 | Imai et al. | 423/DIG. 17 |
| 3,441,216 | 4/1969 | Good | 261/122 |
| 3,490,752 | 1/1970 | Danjes et al. | 210/220 |
| 3,495,712 | 2/1970 | Schreiber | 210/14 |
| 3,533,508 | 10/1970 | Siepp et al. | 210/195 |
| 3,537,583 | 11/1970 | Wahmer et al. | 210/195 |
| 3,642,260 | 2/1972 | Danjes et al. | 261/122 |
| 3,836,131 | 9/1974 | Beggs | 266/20 |
| 3,951,758 | 4/1976 | Porsch | 210/14 |
| 3,977,606 | 8/1976 | Wyss | 239/145 |
| 3,997,634 | 12/1976 | Downs | 261/122 |
| 4,007,240 | 2/1977 | Gosden | 261/122 |
| 4,046,845 | 9/1977 | Veeder | 261/122 |
| 4,243,616 | 1/1981 | Wyss | 261/122 |
| 4,440,644 | 4/1984 | Mudder | 210/611 |
| 4,461,834 | 7/1984 | Mudder | 435/253 |
| 4,468,327 | 8/1984 | Brown | 423/DIG. 17 |
| 4,497,778 | 12/1984 | Pooley | 423/DIG. 17 |
| 4,571,387 | 2/1986 | Bruynesteyn et al. | 75/101 R |
| 4,728,082 | 3/1988 | Emmett, Jr. et al. | 423/150 |
| 4,732,608 | 3/1988 | Emmett, Jr. et al. | 75/101 R |

FOREIGN PATENT DOCUMENTS

| | | |
|---|---|---|
| 45769 | 8/1985 | Australia . |
| 0004431 | 3/1979 | European Pat. Off. . |
| 8426854 | 11/1985 | Fed. Rep. of Germany . |
| 853701 | 5/1985 | South Africa . |
| 8899119 | 5/1980 | U.S.S.R. . |
| 1359324 | 1/1982 | U.S.S.R. . |
| 824376 | 8/1983 | United Kingdom . |
| 2180829 | 9/1986 | United Kingdom . |

OTHER PUBLICATIONS

EPA Technology Profile on Technology of Motec, Inc., dated 11/88.
The Mixing Equipment Company Brochure, Copyright Notice of 1986.
EPA Technology Profile or Technology of Biotrol Inc., dated 11/88.
Chemical Engineering Progress (CEP) Article dated Nov. 1985.

(List continued on next page.)

Primary Examiner—Michael L. Lewis
Assistant Examiner—Steven Bos
Attorney, Agent, or Firm—Trask, Britt & Rossa

[57] ABSTRACT

A reactor vessel for use in treating slurries containing minerals, soils or sludges contaminated with toxic organic substances is disclosed. The vessel includes a tank, having a sealed cover, a mixer arrangement, an air supply arrangement and an exhaust gas recycling system. The air supply arrangement includes one or more porous, flexible membrane diffusers adapted for introducing gas, in the form of fine bubbles, into a tank contained slurry.

12 Claims, 10 Drawing Sheets

OTHER PUBLICATIONS

Fluid Mixing Technology published by McGraw-Hill Co., pp. 16, 17 and 59-63, dated 1983.

Article: "Ferrous Iron Oxidation and Uranium Extraction by Thiobacillus Ferrooxidans", by Roger Guay and Marvin Silver, *Biotechnology and Bioengineering*, vol. 19, pp. 727-740 (1977).

Article: "Microbiological Mining", Scientific American, vol. 247(2), p. 44, 1982, Corale L. Brierly.

Article: "Growth Kinetics of Thiobacillus Ferrooxidans Isolated from Arsenic Mine Drainage", Joan Forshaug Braddock, Huan V. Luong & Edward J. Brown, published in Applied and Environmental Microbiology, Jul. 1984, pp. 48-55.

Paper: "Continuous VAT Biooxidation of a Refractory Arsenical Sulphide Concentrate", presented at the 17th Canadian Mineral Processor's Conference on Jan. 22-24, 1985 by P. Brad Marchant.

Article: "A New Biotech Process for Refractory Gold-/Silver Concentrates" by R. P. Hackl, F. Wright, and A. Bruynesteyn.

Schematic Drawing of Schreiber Corporation, Inc. (Trussville, Ala.) Use of Micro-Organisms for Recovery of Metals by O. H. Tuovinen & D. P. Kelley, International Metallurgical Reviews, Review 179, 1974, vol. 19, pp. 21-30.

Brochure: The Wilfley Weber Flotation Cell (with inserts) Denver, Colo.

Brochure: Wilfley Weber, Inc.

Dorrco *Technical Manual*, Section 32, "Agitator Slurry Mixer", Dec. 1951.

Chemical Engineering Progress (CEP) article dated Nov. 1985.

Fluid Mixing Technology published by McGraw-Hill Co., pp. 16, 17 and 59-63 dated 1983.

Brochure: Schreiber Counter Current Plants (Trussville, Ala.).

Brochure: Schreiber Counter Current Aeration Tank Model GR (Trussville, Ala.).

Brochure: Schreiber Counter Current Aeration (Trussville, Ala.).

Brochure: Schreiber Counter Current Aeration Tank Model GRZ (Trussville, Ala.).

Brochure: Schreiber Counter Current Aeration Tank Model GRO (Trussville, Ala.).

Brochure: Schreiber Counter Current Aeration Tank Model GRD (Trussville, Ala.).

BIOSLURRY REACTOR FOR TREATMENT OF SLURRIES CONTAINING MINERALS, SOILS AND SLUDGES

This is a continuation-in-part application of U.S. application Ser. No. 248,620 filed Jan. 21, 1987, now U.S. Pat. No. 4,968,008, which is a continuation-in-part application of U.S. application Ser. No. 005,670 filed Jan. 21, 1987, now U.S. Pat. No. 4,974,816, which is a continuation-in-part application of U.S. application Ser. No. 827,324 filed Feb. 7, 1986, issued Mar. 1, 1988 as U.S. Pat. No. 4,728,082. The disclosures of those applications are hereby incorporated by reference.

FIELD

This invention relates to apparatus for treating slurries containing minerals, soils and sludges which have been contaminated with toxic organic compounds making them hazardous waste under environmental laws and regulations. More particularly, this invention is directed to an apparatus suited for treating hazardous waste-contaminated solids by means of a bacterial process, e.g. biooxidation.

STATEMENT OF THE ART

Within the last decade, public concern regarding environmental pollution issues has increased markedly. As growing industrial activity continues to produce new and more complex waste by-products, the need for safely disposing of those by-products poses a critical problem for society. In the area of hazardous waste, this need is especially critical in that the particular type of waste constitutes a problem affecting the health and safety of individuals exposed to them.

Former industry practices have resulted in spills and leaks which have led to the contamination of underground water supplies and surrounding soil. Moreover, past illegal disposal in now-abandoned waste dumps presently poses a threat to the environment and concerns nearby residents Also, in many industrial facilities, wastewater was previously disposed of in unlined lagoons which have leaked and contaminated the groundwater. These lagoons often contain considerable quantities of hazardous waste sludges. There is a present need to clean up contaminated waste sites and close existing industrial waste-water lagoons.

Several treatment technologies are applicable and are classifiable under the general categories of physical, chemical and biological treatment. With respect to biological treatment of soil or sludges one can differentiate between in situ treatment and the treatment of liquefied soil slurries in reactor vessels. The apparatus proposed in the following disclosure falls into the latter category.

Presently, three other bioslurry reactor systems are being commercialized. The first system, developed by MOTEC, Inc. of Mt. Juliet, Tennessee involves technology adapted for use in treating pesticides, PCB's, dioxins and halogenated and nonhalogenated organic compounds. While having presently demonstrated effectiveness for treating sludge, liquids and soils having high organic concentrations, the MOTEC process has been found to be unsuitable for use with inorganic laden wastes.

The MOTEC technology, a sequential process, is also referred to as liquid solid contact digestion (LSCD). The system involves two to three tank digestors which are aerated using air spargers and are agitated using turbine mixers. Alternatively, this technology may be adapted, by use of high shear propeller mixers, in lagoons to enhance aerobic biological degradation.

The second technology, developed by Detox Industries, Inc. of Sugarland, Texas, is directed for use in treating chlordane, myrex, oil, phenolics, polycyclic aromatic hydrocarbons, creosote, pentachlorophenol (PCP) and polychlorinated biphenyls (PCB's).

The Detox system includes an open-topped reaction tank or on-site created lagoon which utilizes a synthetic liner. The tank is adapted to retain a slurry and is fitted with air distributors.

Another bioslurry reactor consisting of several agitated and aerated vessels has been used in a pesticide spill application by ECOVA of Redmond, Washington.

Common to all three of the above-described systems is the fact that they are operated in a batch mode. After the placement of contaminated soil and water into the reactor vessel, it is aerated until a desired residual contaminant level is reached, whereupon the supernatant water is usually recycled and the slurry is discharged. Due to the ongoing aeration, many volatile organic substances are not biodegraded but rather are airstripped. Some systems treat the volatiles in a carbon adsorption filter whereas others simply discharge them to the atmosphere.

Common to all hazardous waste treatment systems utilizing bacterial activity is the requirement of providing an adequate supply of oxygen and nutrients to the bacteria. This provision allows biomass growth and facilitates the occurrence of biochemical reactions, thereby leading to the production of carbon dioxide and water as final products. Various approaches have been advanced to optimize bioactivity level in reactor vessels. In those systems wherein a multiplicity of connected reactor vessels have been suggested, e.g. cascade systems, a common problem is the retention and maintenance of biomass in a given reactor as effluent from that reactor is directed to the next reactor.

The clean-up of hazardous waste sites requires innovative approaches that are cost effective. As has been the case in the wastewater treatment sector, biological systems can also play an important role in soil bioremediation. It is important, however, to develop reactor vessels and processes that can handle high solids concentrations and large throughput volumes in order to be cost effective.

SUMMARY OF THE INVENTION

The instant invention is directed to a bioreactor vessel adapted for treating a slurry containing minerals, soils and/or sludges which have been contaminated by toxic organic substances.

The bioreactor vessel of the invention includes generally a tank having a bottom, upstanding walls fixedly mounted thereon and a sealed top or cover. The tank is adapted to receive and contain a slurry. The tank is fitted with a mechanical mixing means which operates to effectuate an agitation and suspension of the particulates within a slurry housed within the tank. An air supply means operates to provide oxygen, a necessary component of the biooxidation reaction taking place within the bioreactor. The air supply means also is configured such as to provide suspension of the particulates within the slurry liquid housed within the tank. In addition, an air lift is provided for recirculating particulates which may have settled out of the slurry.

In preferred arrangements, the system of the invention includes a plurality of reactor vessels connected in series.

The tank may include a drive shaft, having arms radially mounted thereon, adapted to be rotated. This rotation of the arms provides a mechanical mixing and agitation of the slurry contained in the tank and further provides a means for conveying settled solids to a center airlift shaft for the purpose of their recirculation. An impeller, mounted on the air lift shaft, is an option for certain applications.

The air supply means of the invention generally involves the introduction of minute air bubbles near the bottom region of the tank by a plurality of elastic membrane diffusers. The diffusers are mounted and oriented in such a way that their rotation about a vertical axis causes the slurry in close proximity to the diffusers to be agitated. The diffusers may be mounted along the length of each radial arm of the slurry mixer mechanism or perpendicular to it. The radial arms may be rotated about an essentially upright, vertical axis. The diffusers are thus rotated so as to distribute rising air bubbles effectively over a substantially horizontally oriented planar area of the lower region of the tank.

The number of individual diffusers employed and their location relative to each other and to the plan area by way of their mounting on the radial arms of the slurry mixer are determined by the total amount of air required for the biooxidation occurring within the bioreactor. Further, the number and location of diffusers are determined by the oxygen transfer efficiency and capacity of the individual diffusers. The diffusers are mounted on the radial arms of the slurry mixer so as to minimize coalescence of air bubbles and thus to obtain optimum oxygen transfer efficiency.

Further, the slow rotation of slurry mixer mechanism causes minimal drag forces, thereby minimizing energy consumption as compared with the conventional means of utilizing a turbine mixer.

Another benefit of the slow-moving radial arms is the minimization of shear-related degradation, i.e. destruction of the bacteria and related biomass residing in the container.

Slurry may be drawn from the lower portions of the tank through a hollow center shaft pipe and thereafter be directed to radially-mounted distributor pipes. Those pipes may be positioned above the slurry or, alternatively, they may be positioned to discharge into the body of the slurry itself The distributor pipes may direct the lifted slurry outward and downward onto the surface of the slurry retained in the vessel. A lifting mechanism to mechanically raise and lower the radial mixing and conveying arms of the bioreactor may be provided to facilitate start-up out of a consolidated sludge bed.

Since the biooxidation occurs at a better kinetic rate in a narrow temperature range, temperature control in the reactor is required, best achieved through preheating of the slurry and heat preservation through insulation of the tank walls.

Maintaining a high biomass concentration in the reactor is a task requiring the use of equipment ancillary to the bioreactor. A screening mechanism is used to keep a biomass carrying medium from leaving the reactor vessel.

The instant invention also includes a means and method of recirculating the exhaust gas stream from each reactor back into the reactor-contained slurry by means of the diffusers. This recycling minimizes the need for effluent (off-gas) treatment and thus reduces the operating cost of the reactor.

The present invention involves a method of processing slurries by providing a tank having elastic membrane diffusers positioned on radial arms in the lower regions thereof. The diffusers are mounted to be rotated by a driving means for thereby distributing fine bubbles over substantially the entire cross-section of the tank. An airlift means in association with raking means, is adapted for collecting particulates which have settled on the floor of the tank and reintroducing those particulates back into the slurry. The method further includes a means of processing effluent exhaust gases from each reactor vessel by passing the gas through a scrubber for removing the $CO_2$ from the gas. Subsequently, oxygen and methane and/or nitrogen containing gas are added to the exhaust gas to produce a gas stream having preselected concentrations of those gases. Thereafter, those gases are reintroduced to the various reactor vessels by means of the diffusers or an airlift system.

DESCRIPTION OF THE ILLUSTRATED EMBODIMENTS

Figure 1:
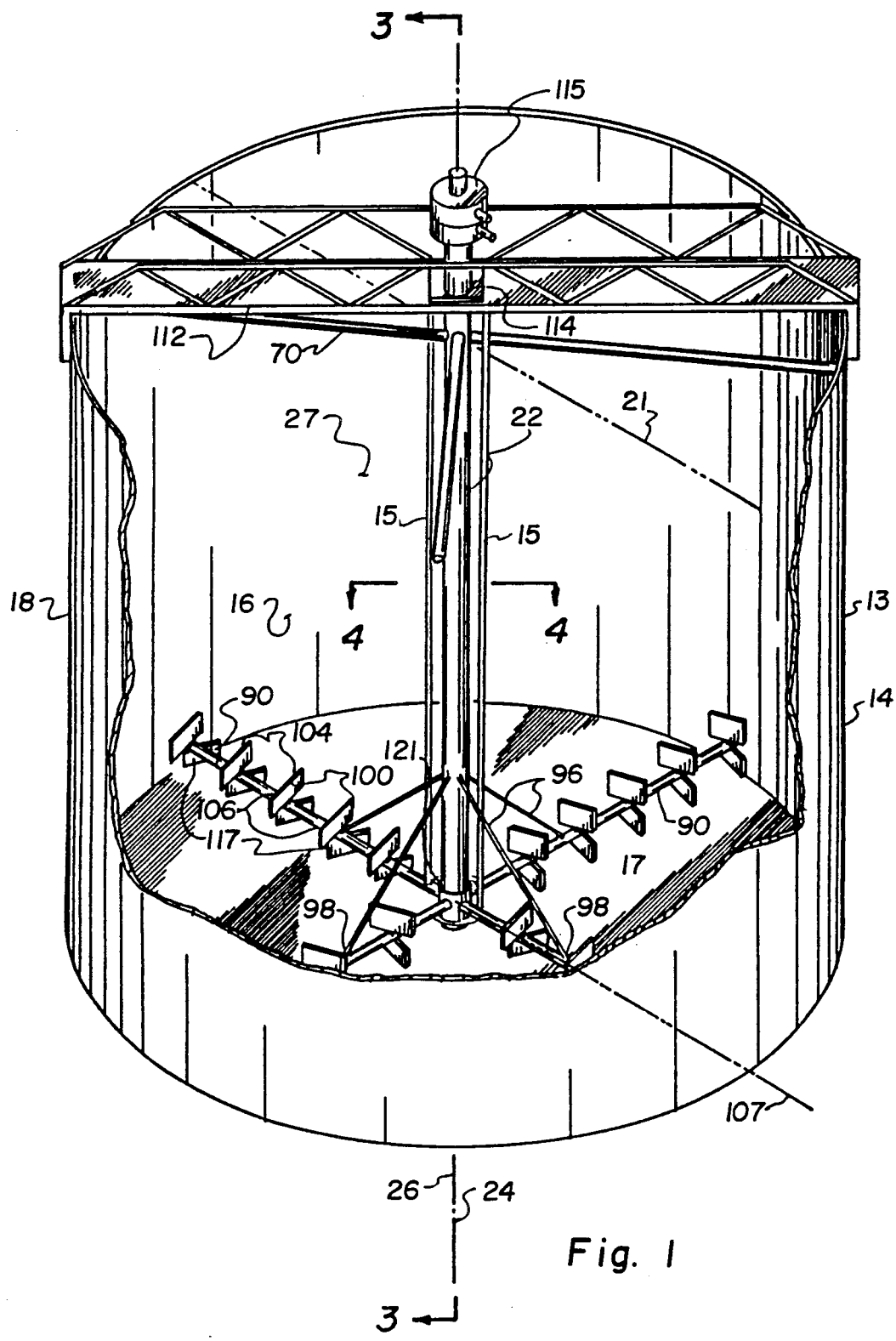
FIG. 1 is an elevated perspective view of the bioreactor vessel of the instant invention including a cut-away portion which reveals a centrally positioned support member fixedly mounted with a plurality of rotating, radially extending arms positioned about a lower section of that support member.

As shown in FIG. 1, a bioreactor vessel, generally 13, of the instant invention includes a tank 14 having suspended therein an air supply means generally 15, adapted to inject air, received from a source exterior of the tank 14, into a liquid medium (slurry), generally 16, which is contained within the tank.

The tank 14 consists generally of a bottom member 17 which is fixedly and sealingly mounted with an upstanding vertical wall or walls 18. As shown, the bottom member 17 may be generally planar and circular in plan view. The upstanding vertical walls 18 may be a single tubular-shaped wall whereby the tank obtains a substantially cylindrical configuration. In a preferred embodiment, the vertical walls 18 define a tank diameter 21 which remains constant over the height of the tank. The upright walls 18 and the bottom planar member 17 are fabricated from materials, e.g. stainless steel, which are chemically resistant to the solids, slurry or by-products which may be housed within the tank.

Positioned within the tank is an air supply means 15. As shown, this supply means may include an elongate tubular support shaft 22 which may be positioned centrally and upright within the tank 14. Shaft 22 includes a longitudinal axis 24 which is oriented substantially upright and passes through, or may be collinear to, the longitudinal axis 26 of the tank 14. The support shaft 22 may be structurally configured in a variety of shapes. As shown, the support shaft 22 may be a substantially cylindrical, tubular pipe member which extends from an elevation, which is above any anticipated liquid level 27 to be obtained within the tank 14, downwardly to an elevation proximate the bottom plate 17 of the tank. Shaft 22 is connected to a drive motor 29 which is mounted on the top of the tank 14. Motor 29 is used to rotate shaft 22 about its axis 24.

Figure 5:
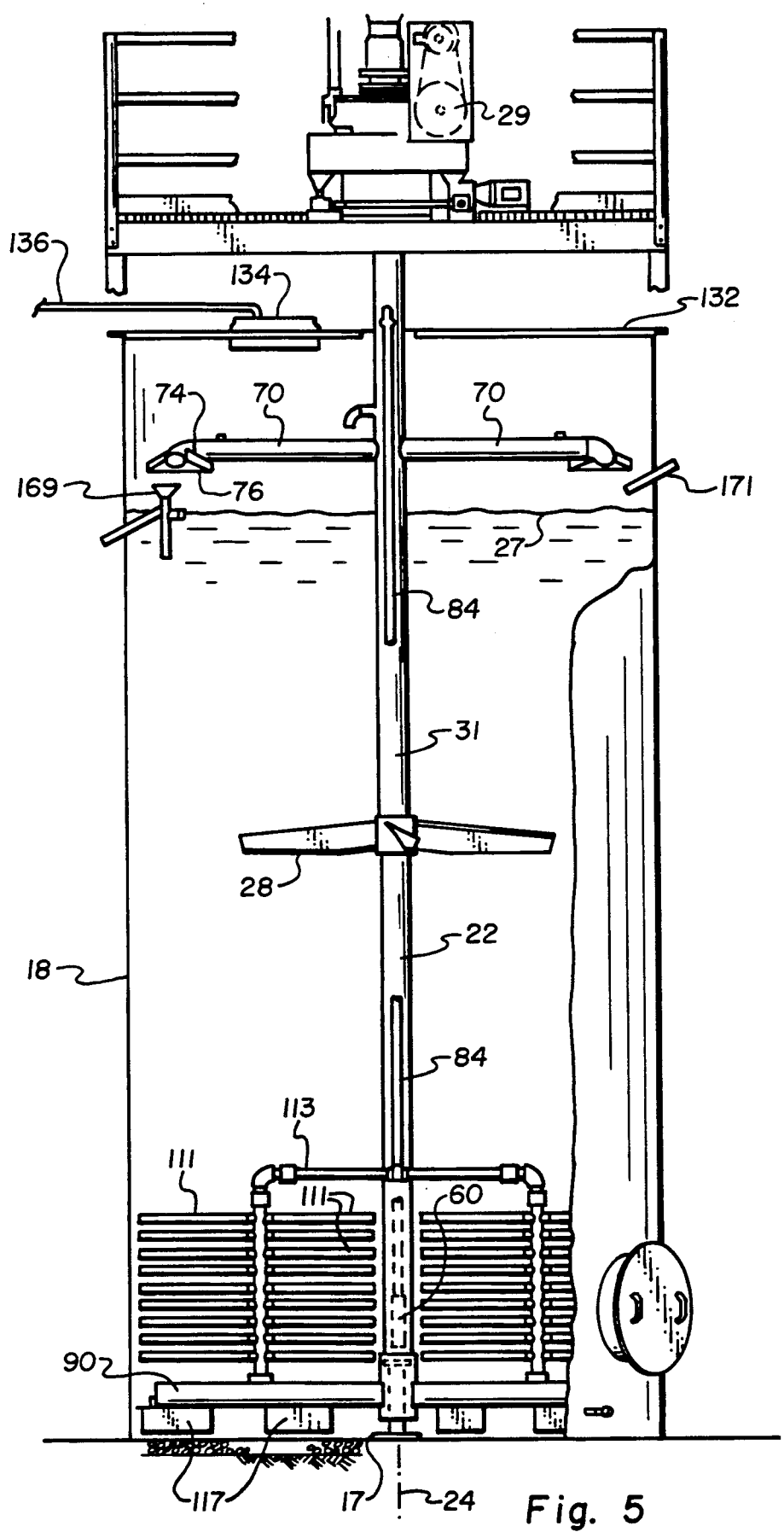
FIG. 5 is a cross-sectional view of a second embodiment of a reactor vessel of this invention.

As shown in FIG. 5, the tank 14 may include a mixing impeller 28 mounted within the interior of the tank. The impeller is constructed and positioned to induce a downwardly directed flow of slurry upon its rotation, i.e. slurry flow in the direction indicated by arrow 31. The impeller, in causing a downward slurry flow, functions to increase the slurry residence time of air bubbles being injected into the slurry proximate the bottom of the tank, in that the downwardly directed slurry flow tends to force the bubbles downward in opposition to their upwardly directed rising displacement induced by the specific gravity differential between the bubbles and the slurry.

The impeller 28 is preferably dimensioned to have a diameter which is approximately two-thirds (2/3) of the diameter of the tank 14. With this dimensioning, the impeller creates a downward directed flow over a major interior volume of the tank while likewise creating an upwardly directed slurry flow (see arrows 28A) about the boundary region of the tank. This particular flow pattern maximizes bubble retention while also contributing a mixing and resuspension action for solids within the slurry.

In a preferred arrangement the impeller 28 may be mounted on the support shaft 22 and is therefore rotated together with shaft 22 by motor 29. In an alternate embodiment, the impeller 28 may be linked to a separate drive motor via a drive shaft 31 which is oriented concentric with shaft 22. In this alternate embodiment, the impeller may be rotated at a different speed than shaft 22. Another embodiment utilizes one or more vertical mixing shafts and impellers which are mounted off-center, i.e. not concentric with shaft 22.

The slurry temperature in the reactor should be controlled. Depending on the particular bacteria employed in the vessel, the temperature will generally be maintained within the range of 20°-35° C.

This temperature may be controlled by preheating the feed slurry being added to the reactor. Additionally, the reactor tank itself may be covered with insulation to assist in retaining heat.

Figure 3:
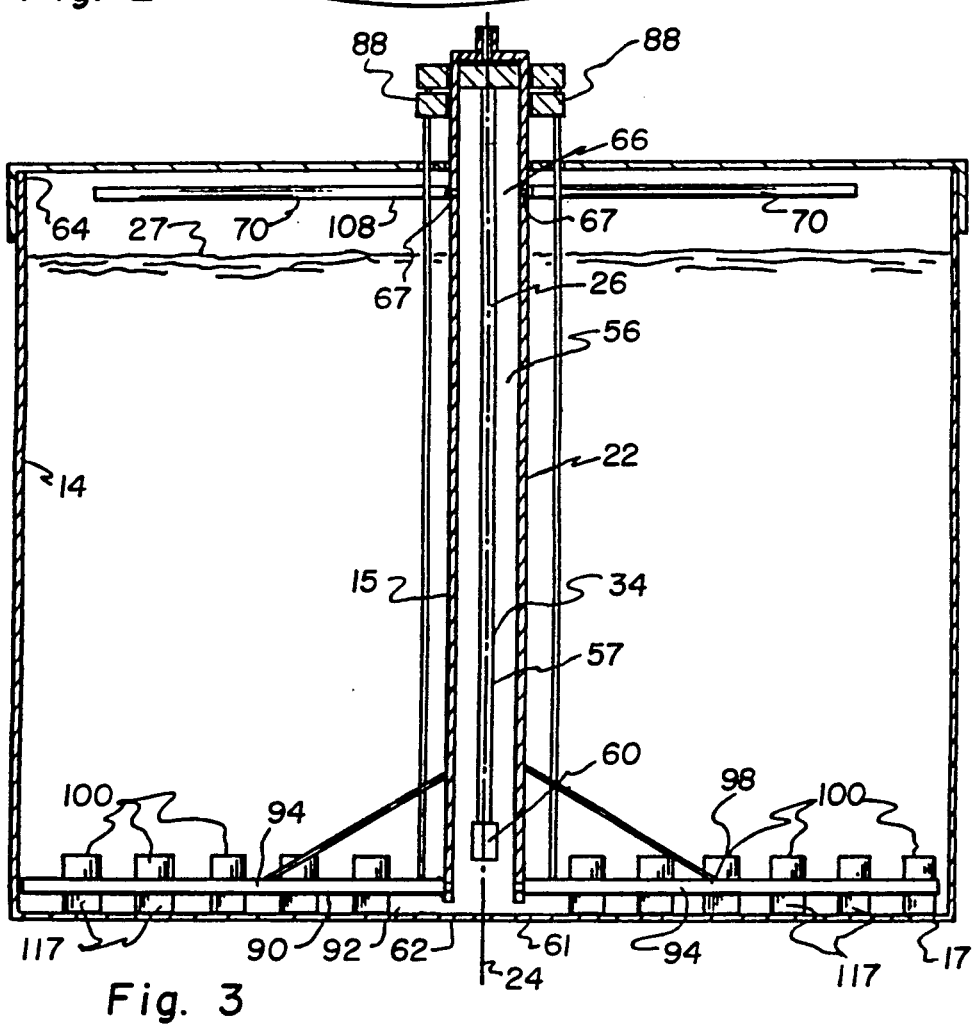
FIG. 3 is a cross-sectional view of the bioreactor vessel shown in FIG. 1.

As shown in FIG. 3, a hollow pipe 57 extends through the hollow interior channel 34 of shaft 22 to a location proximate the bottom 17 of tank 14. The pipe 57 may be fitted on its end with a diffuser 60. Air may be injected through pipe 57 to diffuser 60 and thereafter into the channel 34. Channel 34 communicates with the slurry 16 within the tank 14 by means of an access port 61. Access port 61 is defined by the open end 62 of shaft 22 which is positioned above and out of contact with bottom member 17 of tank 14. As air is injected into the interior of channel 34, a portion of the slurry contained within the channel 34 is driven upwardly along channel 34. Upon reaching the region 66 of channel 34, the slurry portion is directed outward through ports 67 to a plurality of hollow distributor tubes 70 which are fixedly mounted to shaft 22.

As shown in FIG. 5, each distributor tube 70 extends radially from shaft 22 and is positioned elevationally above the surface 27 of the slurry. Each tube 70 is fitted at its end 74 with a discharge nozzle 76 which directs the slurry downward. Since the tubes 70 are rotated about axis 24 by shaft 22, the slurry is discharged over a substantially circular pattern over surface 27 of slurry 16.

In an alternative embodiment, the distributor pipes 70 are positioned lower on shaft 22 whereby the slurry being lifted upwards through channel 34 is discharged outwardly into the body of the slurry instead of being discharged downwardly onto the surface of the slurry. Any foam created on the slurry surface 27 by the action of the distributor pipes 70 is broken up by the addition of defoaming agents to the slurry.

Figure 4:
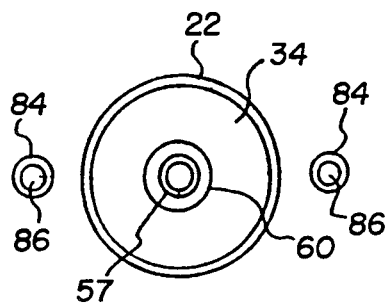
FIG. 4 is a cross-sectional view taken of the support shaft of the bioreactor vessel shown in FIG. 1 taken along sectional lines 3—3.

As shown in FIG. 4, a pair of cylindrical, tubular pipe members 84, each defining an interior channel 86, are mounted adjacent shaft 22. Pipes 84 extend from a rotary valve equipped gas supply means 88, positioned proximate the upper end of shaft 22, downwardly to a plurality of arms 90, mounted radially on shaft 22. Gas supply means 88 is adapted to provide a supply of oxygen-containing gas under pressure to channels 86 and force that gas along the length of those channels 86. Channels 86 communicate at their respective lower ends with one or more channels 94 defined within the interior of each radially extending arm 90.

Each radial arm 90 extends essentially perpendicular outwardly or radially from the support shaft 22 and is dimensioned to extend from that shaft 22 to a location proximate the wall 18 of the tank 14.

As shown in FIG. 1, each radial arm 90 is fitted with a plurality of diffusers 100. Each diffuser individually communicates with the interior channel 94 of the radial arm 90. Air contained in channels 94 is directed outwardly from the arms 90 into the diffusers 100, thereby permitting the oxygen or air to be directed upwardly and outwardly into the slurry 16 residing within the tank 14. The air or oxygen within the diffuser 100 is typically under a pressure of 5 to 25 psig.

In preferred embodiments, the diffusers 100 each include an elastic permeable, porous, replaceable membrane 101 having a hydrophobic outer surface. The membrane 101 defines a plurality of extremely small slits preferably having a mean length of 1.5 mm or less.

Preferred embodiments of the diffuser 100 may utilize membranes fabricated from materials which are chemically resistant to the contaminants contained in the slurry. Such materials may include porous rubber, polypropylene, fluorinated elastomer, and/or similar compounds.

Figure 2:
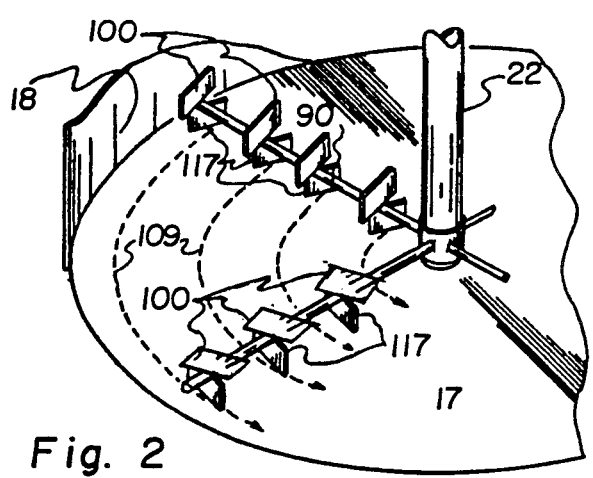
FIG. 2 is an elevated perspective view of the lower portion of the support member shown in FIG. 1.

As shown in FIG. 2, the diffusers 100 may be generally planar members oriented vertically upright or, alternatively, they may be oriented horizontally.

Figure 8:
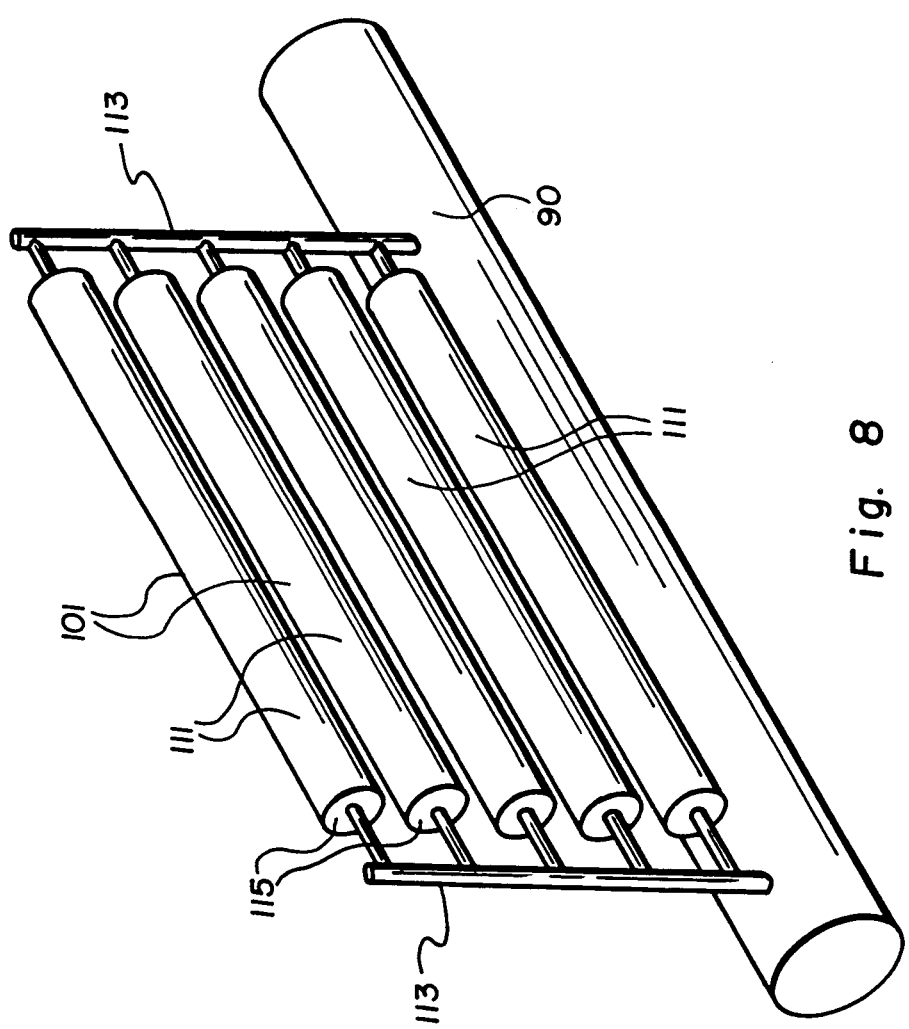
FIG. 8 is a perspective view of a an arrangement of diffusers of the invention.
Figure 10:
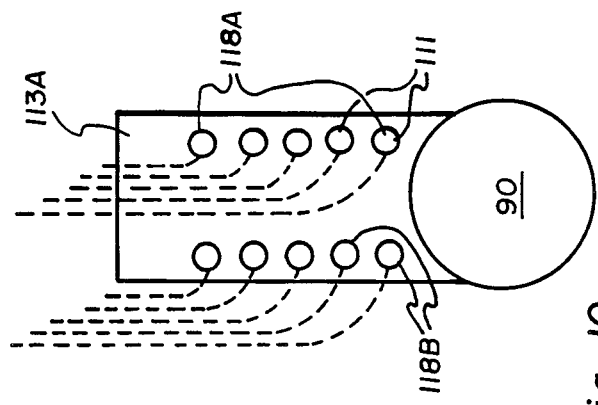
FIG. 10 an end view of the diffuser arrangement of FIG. 9.
Figure 9:
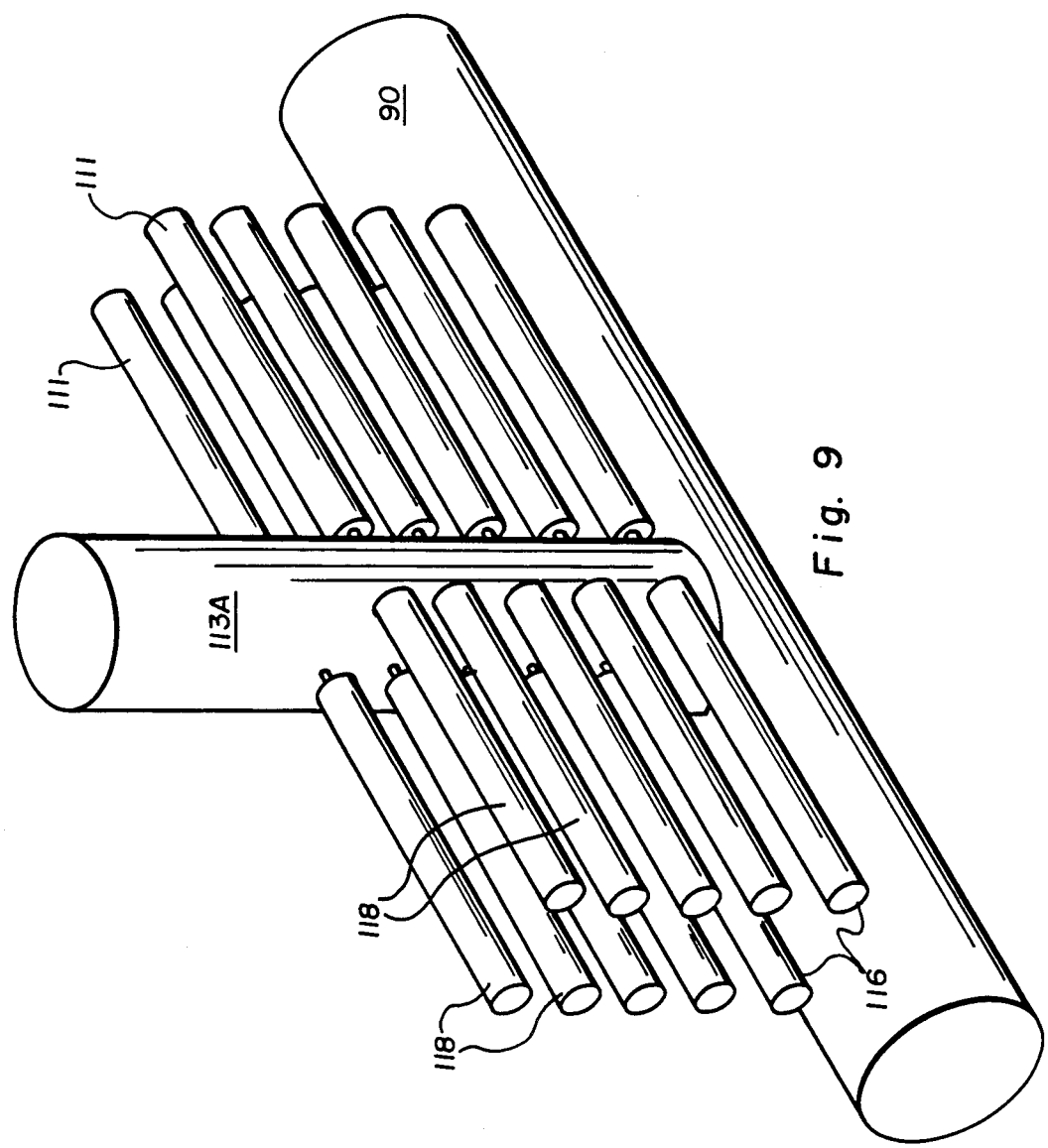
FIG. 9 is a perspective view of an alternative diffuser arrangement.

Preferred embodiments of the diffuser apparatus are shown to advantage in FIGS. 8-10. As illustrated in FIG. 8, a diffuser construction provides a plurality of tubular cylindrical shaped diffusers 111 arranged atop one another to form a vertically stacked array. This diffuser embodiment includes a manifold 113 which introduces air into each tubular diffuser element 111. The manifold 113 may include a plurality of graduated orifices adapted to adjust the volume of air being directed to each respective diffuser 111. Each of the tubular diffusers 111 generally comprises a pair of spaced solid endwalls 115 and a skeletal frame that extends therebetween. A curved tubular sidewall fabricated from a porous flexible membrane 101 is wrapped over the frame and extends between the endwalls.

The support shaft 22 functions as a drive shaft for rotating the plurality of radially extending arm members 90.

FIGS. 9-10 in conjunction with FIG. 5 illustrate an alternative diffuser structure. In this construction a plurality of tubular diffuser structures 111, similar to those of FIG. 8, are arranged to extend outwardly from a centrally positioned manifold 113A, mounted on each radial arm 90. The manifold 113A is connected directly to a respective pipe member 84. In this construction, the arms 90 do not define air-carrying channels 94.

As shown, each of the tubular diffusers 111 are oriented to extend radially outward from the shaft 22. The diffusers 111 are arranged in two vertically stacked arrays or banks 118. In each bank of diffusers 118, vertically adjacent diffusers 111 are positioned spacedly apart from one another, thereby defining a passageway 114 between each pair of adjacent diffusers. When the diffusers 111 are rotated about axis 24 by shaft 22, a stream of slurry passes through each of the passageways 114. In doing so, each respective slurry stream flows over substantially half of the exterior surface area of each of the two diffusers 111 which define the respective passageway 114. The slurry streams function to drive forcedly the bubbles, exiting each diffuser 111, in a lateral direction. Since adjacent slurry streams substantially sweep over the entire surface of a diffuser positioned therebetween, the majority of bubbles exiting any given diffuser are driven laterally rearwardly of the diffuser. When this stream-induced displacement is considered together with the upwardly-directed displacement of the bubbles induced by the specific gravity differential of the bubbles verses the slurry, the bubble flow paths 115 become generally those indicated by the dotted lines in FIG. 10. The operation of the passageways 114 reduces the coalescence of bubbles from different diffusers in that the bubbles are dispersed over a wider spatial area, instead of merely rising vertically.

As shown to advantage in FIGS. 9 and 10, each pair of vertical diffuser banks 118 are positioned spacedly apart from one another by a sufficient distance 116 that bubbles exiting the diffusers 111 of the bank 118A may rise upwardly through the slurry before the rear diffuser bank 118B is displaced into the bubble flow path 115 of the bubbles exiting the forward bank 118A.

The vertical spacing between the adjacent diffusers 111 in the two diffuser banks 118 and the spacing between adjacent vertical diffuser banks is determined experimentally for a given diffuser construction and shaft 22 rotational speed.

As shown in FIG. 1, positioned on the upper region of tank 14 is a bridge support 112 which extends essentially across the diameter 21 of tank 14. Shaft 22 is journaled in bridge support 112. A motor 29 operates to rotate shaft 22 about its axis 26 and thereby effecting a rotation of arms 90 and distributor arms 70.

As shown in FIG. 3, fitted on the lower surface of each radial arm 90 is a plurality of rake-like extensions 117. These extensions 117 are adapted to effect a squeegee-like action on the bottom of the tank. The extensions collect solids or particulates which have been deposited on surface 17 and direct them to a central collecting location proximate access port 61. Rake-like extensions 117 may include a plurality of planar panels. The critical aspect of the extensions 117 orientation is the requirement to direct solids which have become deposited on the bottom 17 of the reactor vessel 13, to a common collection location proximate the air lift shaft access port 61.

The radially extending arms 90 may be mounted on shaft 22 to be vertically slidable along that shaft.

FIG. 5 illustrates a preferred embodiment of an individual reactor vessel system. As shown, the top of tank 14 is sealed from the environment by a sealing cover 132. A filter 134, mounted in the upper reaches of the tank 14, is adapted for drawing off gases from the tank and directing them to a processing means located exterior from the tank.

Figure 6:
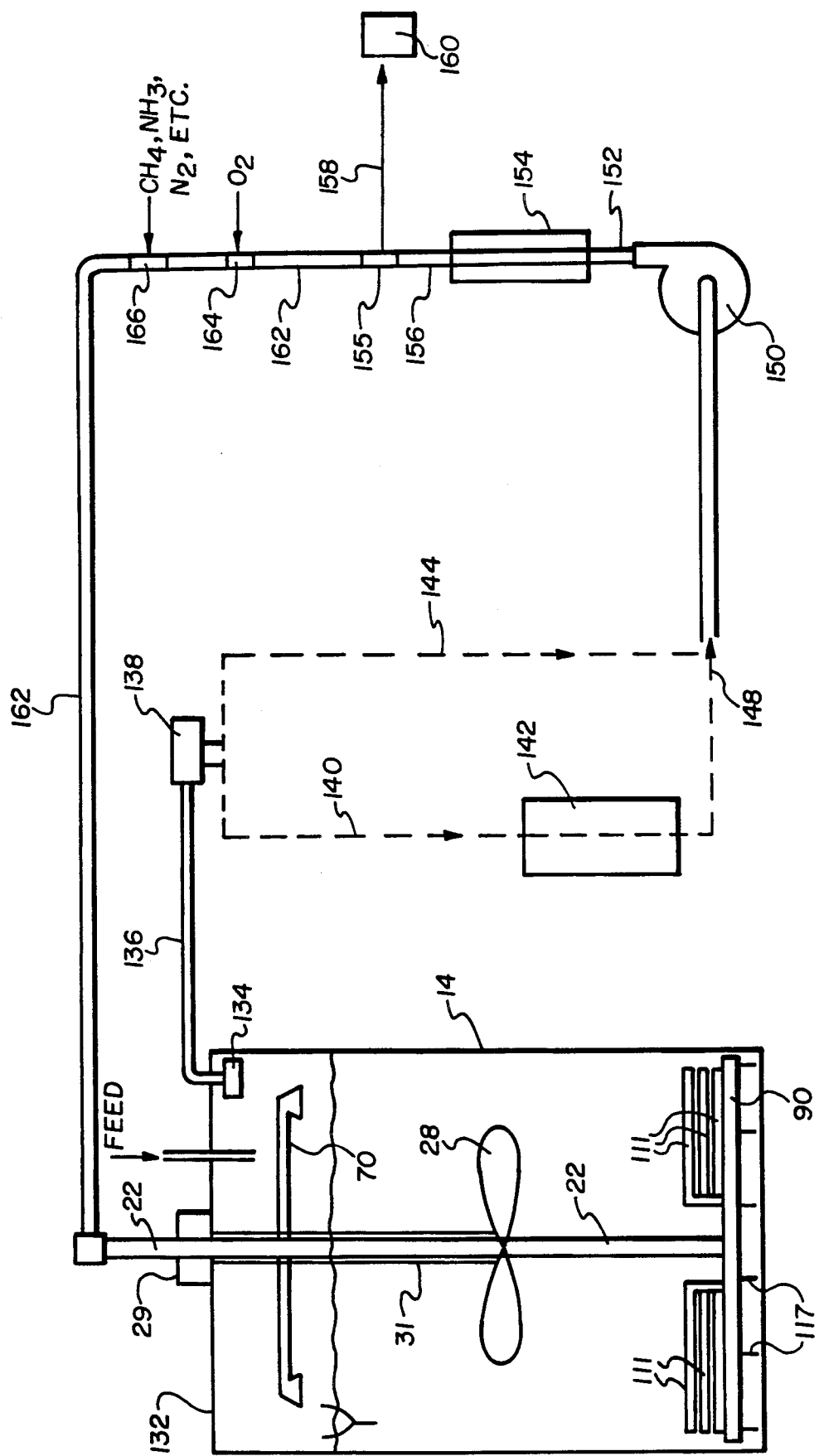
FIG. 6 is a schematic diagram of the exhaust gas recirculation system of the invention.
Figure 7:
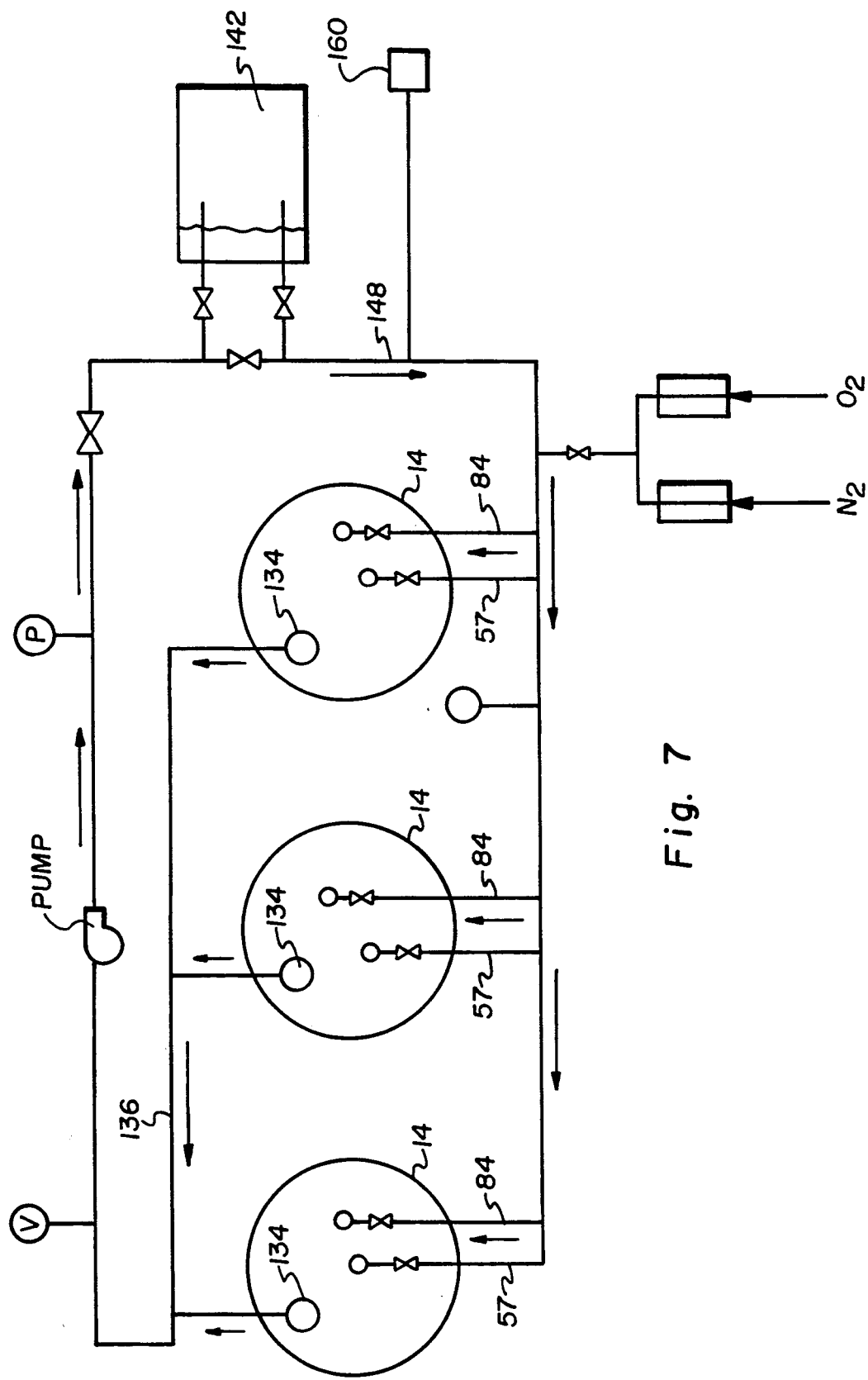
FIG. 7 is a schematic diagram of the exhaust gas recirculation system of a multiple reactor vessel system.

FIG. 6 illustrates the gas recirculating system. The filter 134 is connected by a conduit 136 to a valve 138 which may direct the effluent through conduit 140 to a scrubber 142 adapted for removing carbon waste gas, e.g. $CO_2$ from the effluent. Alternatively, valve 138 may direct the effluent gas through conduit 144. The effluent gas exiting the scrubber 142 is directed through conduit 148 to a compressor 150. As shown, conduit 144 connects with conduit 148 prior to that conduits connection to compressor 150. Gases exiting compressor 150 are directed through conduit 152 to an aftercooler 154, e.g. a heat exchanger of conventional construction. The use of the aftercooler 154 is optional. A conduit 156 leads from the aftercooler to a bleed valve 155. Conduit 158, coupled with valve 155 is adapted to direct a bleed stream to an activated carbon adsorption filter 160. The main stream of effluent gas is directed through valve 155 and into conduit 162. Positioned along the length of conduit 162 are two valves, respectively designated valve 164 and valve 166. The valve 164 is adapted for introducing a supply of oxygen gas from an external supply source (not shown) into the effluent gas stream in conduit 162. The quantity of oxygen being introduced into that stream is adjusted to control the dissolved oxygen concentration in the reactor vessel.

Valve 166 is adapted to receive nitrogen gas in order to maintain a selected relative concentration of gases in the recirculating gas stream. For certain applications, an inducer gas, such as methane, may also be introduced through this valve.

Conduit 162 directs the readjusted effluent gas back to the reactor vessel and is connected to tubular pipes 84 by means of a rotary valve 121A to provide a source of pressurized gas to the diffuser 111. Furthermore, conduit 162 is connected to pipe 57 by means of a rotary valve 121B to provide a source of pressurized gas for the air lift suspension system.

The instant gas supply system, by utilizing the carbon dioxide scrubbing unit and the oxygen enrichment apparatus is adapted for minimizing the volume of effluent gas that must be treated in the carbon adsorption unit.

Figure 11:
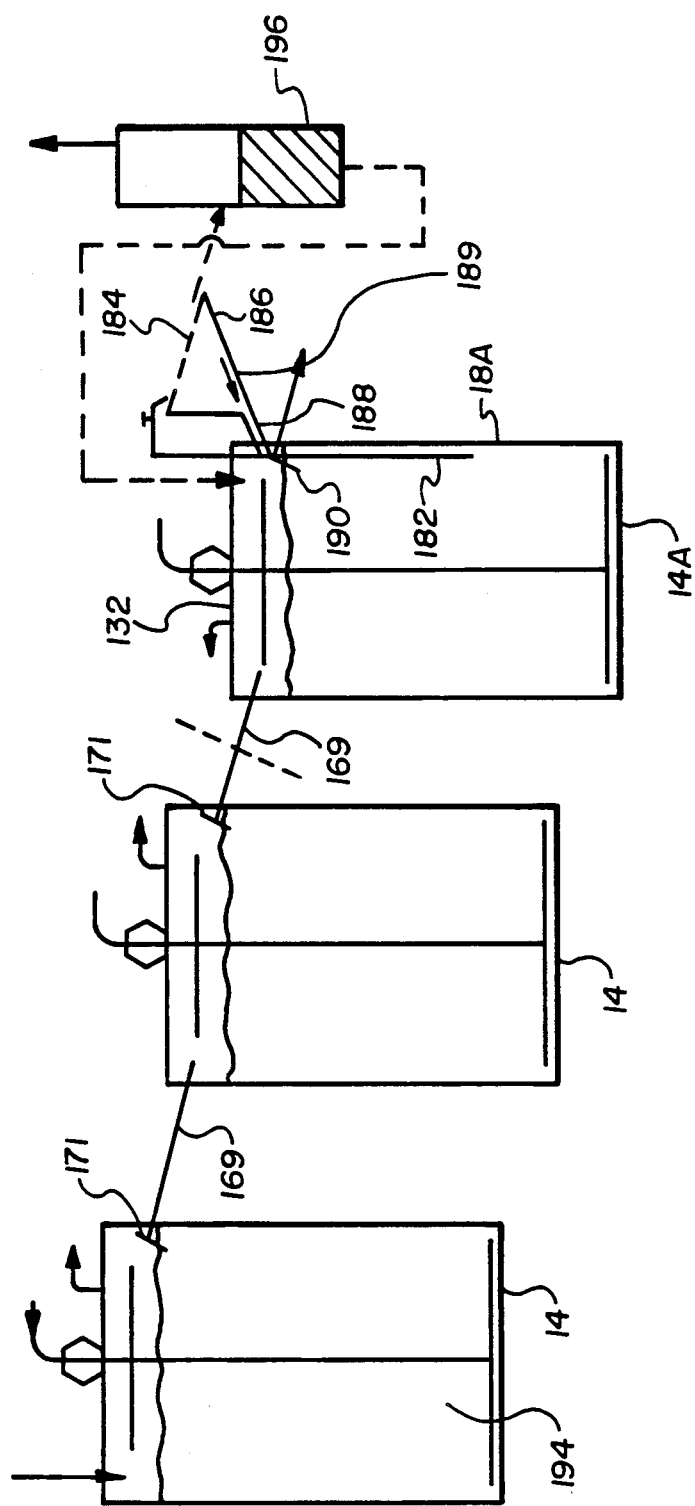
FIG. 11 is a schematic diagram illustrating a multiple reactor vessel embodiment.
Figure 12:
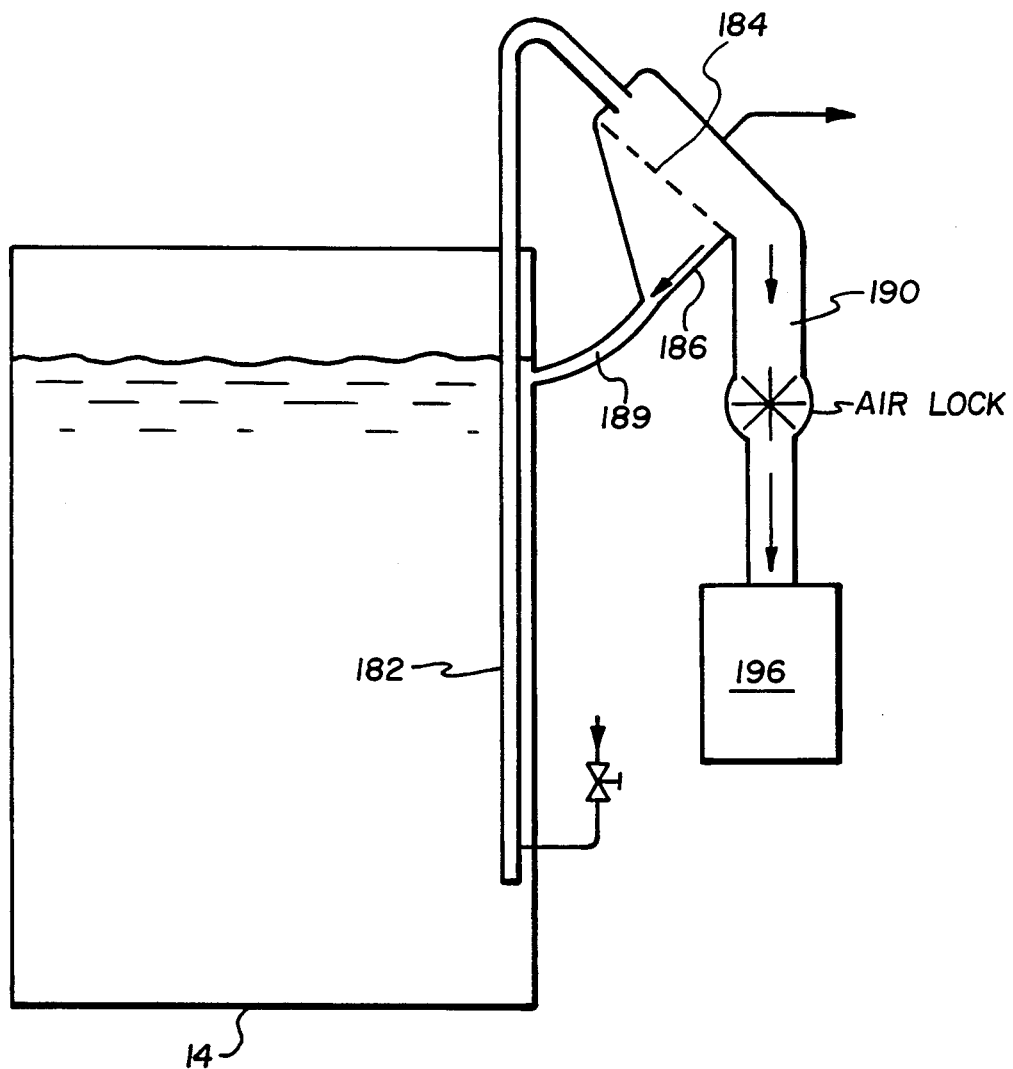
FIG. 12 is a sectional view of a screening means.

FIG. 11 illustrates a plurality of reactor tanks 14 arranged in series. All of the tanks 14 in FIG. 11 are connected with the effluent gas processing system shown schematically in FIG. 11. Each adjacent pair of tanks is connected together by means of a conduit 169 adapted for directing effluent slurry from one tank to another.

Figure 13:
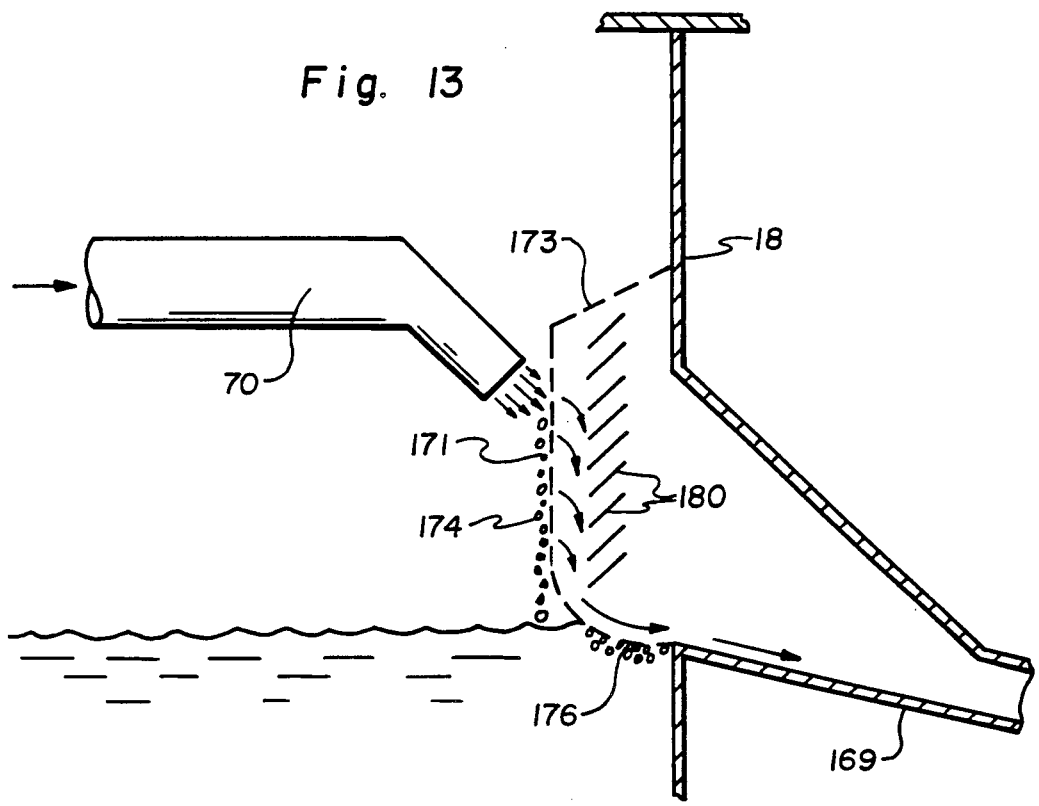
FIG. 13 is a side view of an effluent conduit screen.
Figure 14:
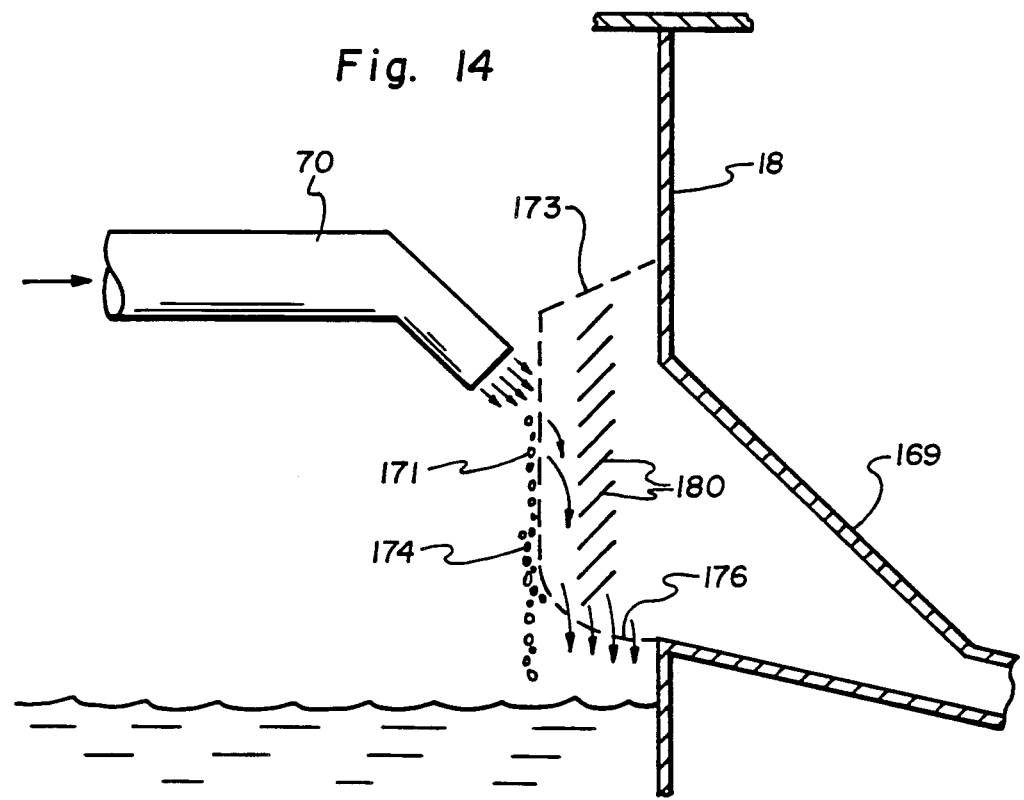
FIG. 14 is a side view of the effluent conduit screen shown in FIG. 13 wherein the slurry in the tank is not at full level.

In a preferred embodiment of the invention, a biomass carrying medium is added to the slurries contained in one or more of the tanks 14 for purposes of retaining bacteria within each of the respective tanks and thereby assisting in maintaining a maximum biomass concentration within each tank. The use of biomass carrying medium, such as silica, plastic pellets (e.g. PVC), granular activated carbon and certain ion exchange resins such as those marketed by the Rohm-Haas Corporation under the trademark "Amber-lite" is contemplated depending on the application. Alternatively, biomass carrying medium manufactured from diatomaceous earth by the Manville Corporation may also be used. These carrying medium are directed to providing anchorage sites for the bacteria. Such carrying medium are of sufficient size that they may be screened and thereby separated from an effluent slurry stream leaving a given reactor vessel. As shown in FIG. 11, each conduit 169 is equipped at its outlet with a screen 171 adapted for retaining the biomass carrying medium in the respective reactor vessel. One contemplated configuration of these screens 171 is shown in detail in FIGS. 13 and 14. As shown, the upright wall 18 of tank 14 defines an aperture therein which is mounted with an open ended conduit 169. A housing 173 mounted on the interior upright surface of wall 18 retains a screen 171 having a vertical, upright section 174 spacedly positioned from wall 18 and a curvilinear section 176 which connects the upright section with the wall 18.

The openings in screen 171 are dimensioned to preclude a passage therethrough of the biomass carrying medium, while permitting the passage of the liquid portion of the slurry together with particulates of a given smaller dimensional size. A plurality of flow directional vanes 180 are mounted within housing 173 and are adapted for diverting an incoming flow of slurry toward the curvilinear section 176 of the screen 171.

The screens 171 are oriented and positioned so as to receive a flow of slurry exiting the air lift distributor arms 70. As shown in FIG. 11, when the slurry level is below the curvilinear screen section, the slurry entering the housing 173 is directed downward by the vanes 180 to the curvilinear screen section 176 and thereafter, the liquid portion of the slurry falls through that screen section 176 and is resultingly returned to the slurry within the tank 14. When the level of the tank contained slurry is at or above the level of the screen section 176, the distributor arm discharged slurry passes through screen 171 and is directed along conduit 169 to the adjacent tank 14. Furthermore, in this condition, the slurry positioned contiguous the screen may likewise pass through the screen 176 and enter conduit 169 as shown by arrow 181.

The use of a biomass carrying medium to retain bacteria may be adopted in one or more of the tanks 14. In one preferred construction, granular activated carbon is used in all of the reactor tanks 14. Carbon is utilized due to its high surface area-to-mass ratio. The spent carbon from the last tank may be either regenerated by conventional means or alternatively, it may be recycled to the previous tanks to make up for the carbon lost in those tanks due to attrition, and thereby provide anchorage sites for anchorage dependent bacteria.

The invention further provides a method of maintaining high biomass concentration within each reactor vessel by providing an anchorage medium within one or more of the reactor vessels. The anchorage medium provides anchorage sites for the bacteria to anchor themselves. Such anchorage medium are dimensioned such that they can be screened from effluent slurry exiting the reactor vessels and can thereby be maintained within their respective reactor vessels.

In the most preferred embodiment, such a medium is placed in all of the tanks with the exception of the last tank 14A. In this last tank 14A, which may be denominated a polishing reactor, granular activated carbon may be substituted for the biomass carrying medium. The use of activated carbon may be accompanied by apparatus directed for regeneration of that carbon. As shown in FIG. 8, a second air lift system 182, having a construction known in the art, is mounted proximate the upright wall 18A of the tank 14A. The system 182 extends upward from the tank 14A, through the sealant cover 132. The system is fitted with a laterally extending conduit adapted for discharging the air lifted slurry outward over an inclined screen 184 mounted over atop a collection basin 186 having an angulated floor 188. The floor 188 is angled to a collection drain 189 which returns the slurry back to tank 14 through the upright wall 18 of that tank. The screen 184 is sized to trap the granular particulate carbon. Due to the inclination of screen 184, the carbon trapped thereon is directed by gravity to a carbon regeneration system 196 which may be of a conventional type, e.g. a kiln. The carbon withdrawal may be operated continuously or intermittently. Any loss in reactivated granular carbon will be made up with fresh carbon.

Tank 14A is fitted with an outlet 190 adapted for drawing off a quantity of decontaminated, processed slurry which is then directed to a dewatering process (not shown).

FIG. 11 also illustrates, in schematic form, a series of reactor tanks 14 wherein the gas supply means of the second and third tank are identical to that previously disclosed in FIG. 6. The gas supply means of sealed tank 194 has been modified whereby no oxygen is directed therethrough into the tank, i.e. tank 194 is adapted for anaerobic operation. As shown, the gas supply system of tank 194 is adapted to introduce methane, nitrogen, or other carrier gases into the tank for the use of mixing the slurry. The operation of the first reactor anaerobically facilitates the breakdown of certain chlorinated compounds contained within the slurry. The operation of the first rector in an anaerobic mode is optional and not required in each application.

Whereas wastewater treatment facilities which utilize bacterial activity as a component in their processing regime typically are constructed and adapted for treating sewage having a solids concentration of 0.02%–0.1%, which subsequent to processing is concentrated to a slurry having a 0.3–1.2% solids concentration, the instant reactor system is adapted for processing slurries having solids concentrations above 6% by weight. Typical operation of the invention is anticipated to effectively treat slurries having a 30%–50% solids concentration.

It is to be understood that the embodiments of the invention herein described are merely illustrative of the application of the principles of the invention. Reference herein to details of the illustrated embodiment is not intended to limit the scope of the claims which themselves recite those features regarded as essential to the invention.

What is claimed:

1. A reactor vessel for use in treating through use of bacteria, slurries containing minerals, soils, or sludges, including such slurries as may be contaminated with hazardous waste organic compounds, said slurries having a solids concentration by weight of approximately 6% or more, said vessel comprising:

a container means for containing a quantity of slurry;

an oxygen supply means mounted within said container means, said oxygen supply means including at least one flexible porous membrane diffuser adapted for receiving a supply of oxygen-containing gas and distributing said gas into said container means in a form of fine bubbles;

a mixing means for mixing and recirculating the slurry contained within said container means, said mixing means being positioned adjacent a bottom of said container means;

an exhaust gas recycling means mounted on said container means for drawing off a quantity of exhaust gas from said container means, treating said quantity of exhaust gas by extracting carbon dioxide therefrom, injecting oxygen into said quantity of exhaust gas and thereafter reintroducing said quantity of exhaust gas into said container means by means of said oxygen supply means;

wherein said container means is sealed to prevent escape of exhaust gas.

2. The reactor vessel of claim 1 wherein at least one driven impeller means is mounted within said container means in vertically spaced rotation to said oxygen supply means, said driven impeller means being adapted for inducing a vertically directed flow of said slurry within said container means to effect bulk blending of said slurry within said container means.

3. The reactor vessel of claim 1 wherein said container means includes rake means mounted adjacent said bottom of said container means, for scraping said bottom and directing any concentrations of solid deposited on said bottom to a central collection location within said vessel.

4. The reactor vessel of claim 2 wherein said container means is fitted with a lift means centrally positioned within said reactor vessel over a collection location for upwardly transporting solids from said collection location, said collection location being located centrally within said reactor vessel.

5. The reactor vessel of claim 1 wherein a lift means adapted for transportating said solids to a height above a surface level of said slurry contained within said container means and thereafter discharging said solids over said surface level is mounted within said container means.

6. The reactor vessel of claim 5 wherein said lift means is adapted for discharging said solids over a screen mounted within said container means, said screen being mounted over a discharge conduit adapted for directing slurry as effluent away from container means.

7. The reactor vessel of claim 1 wherein said flexible porous membrane diffuser is mounted upright.

8. The reactor vessel of claim 1 wherein said flexible porous membrane diffuser is mounted horizontally.

9. The reactor vessel of claim 1 wherein said exhaust gas recycling means also injects methane into said exhaust gas.

10. The reactor vessel claim 1 wherein said exhaust gas recycling means also injects nitrogen into said exhaust gas.

11. The reactor vessel of claim 4 wherein said lift means is adapted to redistribute said solids into said slurry above a surface level of said slurry contained within said container means.

12. The reactor vessel of claim 2 wherein said impeller means is rotatable at a rotational velocity different from said means for mixing and recirculating said slurry.

* * * * *